United States Patent
Kajiwara et al.

(10) Patent No.: US 10,072,130 B2
(45) Date of Patent: Sep. 11, 2018

(54) FIBER-REINFORCED COMPOSITE MATERIAL AND PROCESS FOR PRODUCING FIBER-REINFORCED COMPOSITE MATERIAL

(71) Applicant: TORAY INDUSTRIES, INC., Tokyo (JP)

(72) Inventors: Kentaro Kajiwara, Otsu (JP); Satoru Shimoyama, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 665 days.

(21) Appl. No.: 14/356,534

(22) PCT Filed: Nov. 14, 2012

(86) PCT No.: PCT/JP2012/079451
§ 371 (c)(1),
(2) Date: May 6, 2014

(87) PCT Pub. No.: WO2013/073546
PCT Pub. Date: May 23, 2013

(65) Prior Publication Data
US 2014/0303306 A1  Oct. 9, 2014

(30) Foreign Application Priority Data

Nov. 16, 2011 (JP) .................. 2011-250287
Nov. 16, 2011 (JP) .................. 2011-250288
Mar. 21, 2012 (JP) .................. 2012-063165
May 24, 2012 (JP) .................. 2012-118211
May 24, 2012 (JP) .................. 2012-118212

(51) Int. Cl.
*C08K 3/04* (2006.01)
*C08J 5/04* (2006.01)
*C08J 99/00* (2006.01)

(52) U.S. Cl.
CPC .......... *C08K 3/04* (2013.01); *C08J 5/042* (2013.01); *C08J 2300/22* (2013.01); *C08J 2300/24* (2013.01); *C08J 2323/10* (2013.01); *C08J 2361/04* (2013.01); *C08J 2361/28* (2013.01); *C08J 2363/00* (2013.01); *C08J 2367/00* (2013.01); *C08J 2367/06* (2013.01); *C08J 2371/00* (2013.01); *C08J 2377/00* (2013.01); *C08J 2381/02* (2013.01)

(58) Field of Classification Search
CPC ........................................... C08K 3/04
USPC ........................................... 524/495
See application file for complete search history.

(56) References Cited

U.S. PATENT DOCUMENTS

| | | | |
|---|---|---|---|
| 4,868,038 A * | 9/1989 | McCullough, Jr. | C08K 7/06 428/222 |
| 2007/0101561 A1 | 5/2007 | Rocher et al. | |
| 2009/0233092 A1 | 9/2009 | Hara et al. | |
| 2013/0206349 A1 * | 8/2013 | Nonni | D21C 9/163 162/158 |
| 2013/0323495 A1 | 12/2013 | Kajiwara et al. | |

FOREIGN PATENT DOCUMENTS

| | | |
|---|---|---|
| JP | 59-94657 A | 5/1984 |
| JP | 2007-512449 A | 11/2007 |
| JP | 2008-208490 A | 9/2008 |
| JP | 2011-21303 A | 2/2011 |
| WO | WO-2007/126133 A1 | 11/2007 |
| WO | WO 2012/114829 A1 | 8/2012 |

OTHER PUBLICATIONS

International Search Report for PCT/JP2012/079451 dated Feb. 5, 2013.
Written Opinion of the International Searching Authority for PCT/JP2012/079451 dated Feb. 5, 2013.

* cited by examiner

*Primary Examiner* — Ling Siu Choi
*Assistant Examiner* — Thuy-Ai N Nguyen
(74) *Attorney, Agent, or Firm* — Birch, Stewart, Kolasch & Birch LLP

(57) ABSTRACT

A fiber-reinforced composite material which comprises carbon fibers and a resin, wherein the carbon fibers have crimps and have been entangled and the fiber volume content is 30 to 80%. The fiber-reinforced composite material combines quasi-isotropy with a high fiber volume content and has little unevenness in mechanical property.

9 Claims, No Drawings

FIBER-REINFORCED COMPOSITE MATERIAL AND PROCESS FOR PRODUCING FIBER-REINFORCED COMPOSITE MATERIAL

TECHNICAL FIELD OF THE INVENTION

The present invention relates to a fiber-reinforced composite material comprising carbon fibers and resin as well as a process for producing the fiber-reinforced composite material.

BACKGROUND ART OF THE INVENTION

Fiber-reinforced composite materials comprising carbon fibers and matrix resin are excellent in mechanical properties with a high specific strength and a high specific elastic modulus and also have high functional properties such as weatherability and chemical resistance, so that they have attracted attention to be demanded as materials for aircrafts and general industrial use.

Patent document 1 discloses a prepreg as a fiber-reinforced composite material which has been made from resin and unidirectionally-oriented fiber base material made from non-crimp continuous carbon fibers. Such a composite material is excellent in mechanical properties with a high fiber volume content since the fibers are packed densely as oriented unidirectionally. Further, since it can be designed to have required mechanical properties precisely with little unevenness in mechanical properties, it has been variously applied to aircrafts, etc.

However, it is known that fiber-reinforced composite materials can exhibit only a unidirectional strength along the fiber orientation. Therefore, a piece of such a composite material provides an in-plane anisotropy which exhibits a high strength only in a direction along the unidirectional fiber orientation. In order to ensure an isotropy of mechanical properties, a plurality of composite materials can be laminated so that they are oriented variously, such as along a fiber orientation, perpendicularly to the fiber orientation and obliquely to the fiber orientation. Such a laminated material requiring additional costs tends to form a thick product which exfoliates between layers easily relative to the one not laminated.

Patent document 2 discloses a chopped strand prepreg comprising resin and carbon discontinuous fibers having number average fiber length around 15 to 45 mm. Such a prepreg in which fibers are randomly oriented can exhibit a quasi-isotropy without laminating the composite materials.

However, it is difficult to obtain a composite material having a high fiber volume content since the randomly-oriented rigid fibers impregnated with resin cannot be packed densely.

On the other hand, a process for producing an entangled carbon fiber nonwoven fabric is known as being applicable to an electrode base material for sodium-sulfur batteries other than fiber-reinforced composite materials impregnated with resin. Although it is difficult to entangle rigid carbon fibers, an entangled carbon fiber nonwoven fabric can be obtained by burning entangled polyacrylonitrile flame-resistant yarns as a precursor of polyacrylonitrile-based carbon fibers, as disclosed in Patent document 3.

On the other hand, in order to entangle fibers or give cushion characteristics and bulkiness to a nonwoven fabric applied to cushion material, mat or the like, fibers have been crimped conventionally.

Such a battery electrode base material focused on conductivity of carbon fibers has not been required to be strong so much. Patent document 4 discloses that carbon fibers used for a fiber-reinforced composite material should not be crimped so as not to be mechanically damaged to deteriorate the carbon fibers. Therefore, it is not usual that carbon fibers used for fiber-reinforced composite materials are positively entangled or crimped, in case that the strength decreases.

Patent document 5 discloses a technology that acrylic fibers as a precursor of flame-resistant fiber are crimped and then treated to be flame-resistant without any tension, and then are burnt to make carbon fibers.

Although it is important in practical study what kind of structure is formed with fibers, Patent document 5 only discloses that it is suitable for various electrode base materials while it doesn't disclose concretely about any composite material made from nonwoven fabric which has been entangled with the carbon fibers and impregnated with resin. It discloses neither quasi-isotropy nor high fiber volume content.

PRIOR ART DOCUMENTS

Patent Documents

Patent document 1: JP2004-277955-A
Patent document 2: WO2007/020910
Patent document 3: JP11-350258-A
Patent document 4: JP2011-6833-A
Patent document 5: JP2004-270095-A

SUMMARY OF THE INVENTION

Problems to be Solved by the Invention

As described above, it has been difficult for the chopped strand prepreg, as disclosed in Patent document 2, to be provided as a composite material having a high fiber volume content because of the random orientation and rigidity of the fibers, although the random orientation provides the fibers with a quasi-isotropy while the rigidity provides the fibers with a high strength. Further, the inventors found that rigid fiber bundles tend to fluctuate in position to cause distribution unevenness or orientation unevenness in the fibers, so that mechanical properties might deteriorate and the strength might become uneven.

Accordingly, it could be helpful to produce a fiber-reinforced composite material in which a quasi-isotropy and a high fiber volume content are both achieved together with unevenness in mechanical properties.

Means for Solving the Problems

To achieve the above-described object, the present invention is configured as follows. A fiber-reinforced composite material according to the present invention comprises carbon fibers and a resin while the carbon fibers are crimped and entangled, wherein a fiber volume content is 30 to 80%. A method for producing a fiber-reinforced composite material according to the present invention is characterized in that crimped precursor fibers for carbon fiber are entangled, compressed and then burnt, and are impregnated with a resin to make a fiber volume content set to 30 to 80%.

Effect According to the Invention

The present invention makes it possible to provide a composite material with a high fiber volume content as well as a quasi-isotropy as a single composite material piece. Further, the distribution unevenness and orientation unevenness of the fibers are prevented in a process of the formation, so that mechanical properties are prevented from being uneven.

EMBODIMENTS FOR CARRYING OUT THE INVENTION

In the present invention, a carbon fiber may be polyacrylonitrile-based (may be abbreviated as PAN-based) carbon fiber, pitch-based carbon fiber, rayon-based carbon fiber or phenolic resin-based carbon fiber. Above all, the PAN-based carbon fiber is preferable from a viewpoint of having an excellent strength. It is preferable that the carbon fiber has been opened in order to enhance the adhesiveness and tendency to be impregnated with resin. Generally, carbon fibers decrease greatly in impregnation if the fiber volume content of the carbon fibers is over 20%. Therefore in the present invention wherein the fiber volume content is no less than 30%, it is preferable that the carbon fiber is opened.

The carbon fibers have crimps in the present invention. In the description, the term of crimp implies a bending shape, buckling shape and curving shape, such as spiral, zigzag and Ω-shaped. With such a crimp, the fiber orientation may be unidirectional macroscopically while fibers are oriented in various directions with respect to the surface and thickness within 1 cm×1 cm area. The carbon fibers have at least one of bending shape, buckling shape and curving shape observed macroscopically within 1 cm×1 cm area. If any of the bending shape, buckling shape and curving shape is not observed macroscopically within 1 cm×1 cm area, the frequency of crimps is too low to prevent from causing anisotropy and destruction. Therefore, a curving shape as observed in nonwoven fabrics prepared by the melt-blow method or spunbonding method has undesirably low frequency of crimps.

As described above, in order to entangle fibers or give cushion characteristics and bulkiness to nonwoven fabrics applied to cushion material, mat or the like, fibers have been crimped conventionally. On the other hand, Patent document 4 discloses that carbon fibers used for a fiber-reinforced composite material should not be crimped so as not to be mechanically damaged to deteriorate in physical properties at portions bending. Thus the carbon fibers are ordinarily used as is in straight shapes.

The inventors found an unknown effect that a composite material comprising carbon fibers having crimps can exhibit a quasi-isotropy without laminating. The crimp may have various shapes such as wave, coil and the like. Above all, it is preferable that the composite material has a zigzag shape including sharply-bending crimp mountains/valleys as well as microscopically-straight portions from a viewpoint of having higher strength. It is because the shape of crimps is randomly-oriented microscopically. Thus, the bulkiness of fibers can be suppressed better in comparison with a method shown in Patent document 2 in which rigid fiber bundles impregnated with resin are randomly-oriented to exhibit the quasi-isotropy.

The quasi-isotropy implies a characteristic that tensile strength and tensile elastic modulus have a macroscopic isotropy in a surface. It is preferable that a CV level (standard deviation/average) of every-15-degrees tensile strength and tensile elastic modulus in a piece of composite material is less or equal to 15%, and is less or equal to 10% more preferably, and is less or equal to 5% further preferably.

The number of crimps of crimped yarn can be measured according to JIS L10158.12.1 (2010), and is generally 2 to 50/25 mm. However, it has never been known that provided crimps would achieve a quasi-isotropy. In order to prevent the strength from decreasing while achieving the quasi-isotropy, it is preferable that the number of crimps is 2.0 to 20.0/25 mm, and more preferably 4.0 to 8.0/25 mm. If it is less or equal to 20.0/25 mm, the strength could be prevented from decreasing. The effect of the prevention would be predominant if it is no more than 8.0/25 mm in particular. On the other hand, if it is more or equal to 2.0/25 mm, the composite material would be excellent in quasi-isotropy. The effect of the improvement would be predominant if it is no less than 4.0/25 mm in particular.

The crimp percentage can be measured according to JIS L10158.12.2 (2010), and is generally 1 to 30%. In order to prevent fibers from breaking, it is preferable that the crimp percentage is more or equal to 5.0%, and more preferably more or equal to 10.0%. From a viewpoint of improving the elastic modulus, it is preferable that the crimp percentage is less or equal to 20.0%, and more preferably less or equal to 15.0%.

In the present invention, carbon fibers have been entangled. The entangling implies a condition where fibers or different portions of a certain fiber are hooked to each other to bend. It is generally difficult for fibers having a high elastic modulus and a low elongation to be entangled because it is hardly bent. In order to entangle carbon fibers, the fibers can be entangled in a condition of a low elastic modulus and a high elongation and then enhanced in elastic modulus by a certain means as described later. The entangled carbon fibers have an improved form stability of carbon fiber structure itself to achieve an excellent handling ability. Further, when the composite material is formed, unevenness of mechanical properties can be suppressed. For example, less numbers of free fibers can reduce the strength unevenness of the composite material and the distribution unevenness of fibers which tends to be caused in a forming process can be suppressed.

The entangling of carbon fibers can be observed desirably as unevenness of fiber axial directions which is caused by bending and hooking. It is at least determined that fibers having the same fiber axial direction haven't been entangled to each other. The following determination method is suitable to a case that it is difficult to observe the formation. When a carbon fiber nonwoven fabric over 1 cm×1 cm is immersed entirely in water of no less than 100 times weight of the nonwoven fabric either after removing resin from the composite material or before impregnating resin into the material, it is determined that the carbon fiber nonwoven fabric capable of keeping the present formation after being left for 1 minute is entangled. The formation is determined to be kept up if a dry specimen weight hasn't decrease by 10% from the initial specimen weight before being immersed in water while the specimen hasn't increase by 10% in any direction.

In the present invention, the carbon fibers may have any fiber length and may be continuous fibers or discontinuous fibers. It is advantageous that the continuous fibers don't need a cutting process. It is also advantageous that the discontinuous fibers can be randomly dispersed to exhibit a quasi-isotropy and can be mass-produced with a good formability at a low cost. It is preferable that the carbon fibers are discontinuous fibers, because discontinuous fibers exhibit an excellent quasi-isotropy and it has been difficult for a composite material having a high fiber volume content to be prepared with discontinuous fibers conventionally.

It is preferable that the discontinuous fibers have number average fiber length of 51 to 200 mm. The number average fiber length is preferably more or equal to 51 mm in order to provide a composite material with a good strength while it is preferably less or equal to 200 mm from a viewpoint of easily randomly-orienting the fibers. Reinforcing fibers having such a number average fiber length can be combined by a high volume content with resin, so that the quasi-isotropy is balanced with the strength of the composite material to achieve a low cost as well as high mechanical properties as an advantage of the present invention. It is more preferable that the number average fiber length is more or equal to 70 mm and is more preferably more or equal to 100 mm from a viewpoint of improving the strength of the composite material. It is more preferable that the number average fiber length is less or equal to 160 mm and is more preferably less or equal to 140 mm from a viewpoint of easily controlling fiber orientation directions.

The number average fiber length implies an average length of fibers determined by observing 400 pieces of carbon fibers, which have been randomly-selected from a carbon fiber nonwoven fabric prepared by removing resin from sections of a fiber-reinforced composite material, by 10 μm unit with an optical microscope or a scanning electron microscope.

In the present invention, the resin may be a thermosetting resin, such as epoxy resin, unsaturated polyester resin, melamine resin, phenolic resin and polyimide resin or may be a thermoplastic resin such as polyetheretherketone resin, polyphenylene sulfide resin, polyamide resin, polypropylene resin and polyester resin, or the like. It is preferable to employ the thermoplastic resin because it could easily be formed at an advantageous cost and because fibers could be improved in fluidity by increasing the viscosity in being formed.

The composite material in the present invention comprises the carbon fibers and resin, and the fiber volume content of carbon fibers is 30 to 80%. If the fiber volume content is more or equal to 30% and is preferably more or equal to 40%, a high tensile strength and tensile elastic modulus can be exhibited. Further, if it is less or equal to 80%, is preferably less or equal to 70% and is further preferably less or equal to 60%, a material excellent in specific strength can be prepared as suppressing the fiber breakage and achieving higher physical properties of carbon fibers.

As described above, a base material in which rigid fibers are randomly-oriented cannot easily be packed densely and therefore a high fiber volume content cannot be easily achieved because of the bulkiness. However, a base material having a high apparent density with flexible fibers before being rigidized could be impregnated with resin to prepare a composite material having a high fiber volume content. Thus a quasi-isotropy and a high fiber volume content can be achieved at the same time. Further, such a composite material comprising crimped fibers which haven't been used on concern that mechanical damages might decrease the strength has physical properties rather higher than those of fibers without crimps because the high fiber volume content can be achieved as suppressing a fiber breakage.

The fiber-reinforced composite material according to the present invention is excellent in quasi-isotropy enough to minimize the number of lamination. For example, even one or two pieces of composite material exhibit sufficient isotropy and strength. Particularly, the present invention desirably provides even one piece of such a composite material without lamination. In such an embodiment, the strength between layers can be prevented from deteriorating at a low forming cost.

In the present invention, it is preferable that a total ratio of COO group and C—O group in C1s peak measured with an ESCA on a surface of a nonwoven fabric of the carbon fibers is more or equal to 5%. It is preferably more or equal to 10%, and is more preferably more or equal to 15%. The COO group and C—O group can be introduced by oxidizing carbon fibers to enhance the adhesiveness to the resin so that a strong composite material is achieved.

Here, the carbon fiber on the nonwoven fabric is subjected to the measurement at randomly-selected 5 points, and measured values obtained in the following method are averaged. The ratios of COO group and C—O group on the carbon fiber nonwoven fabric are obtained in the following method of measurement with ESCA (Electron Spectroscopy for Chemical Analysis). C1s peak is split to obtain the ratios of COO group, C—O group and C—C group in the C1s peak and then a total ratio of COO group and C—O group is calculated. In order to perform a charge correction of a spectrum obtained by the C1s spectrum measurement, the peak is split in the following condition: the main peak is positioned at 284.6 eV corresponding to the binding energy among C—C, C═C and CHx; the C—O group peak is positioned at 286.6 eV, the C═O group peak is positioned at 287.6 eV; the COO group peak is positioned at 288.6 eV, conjugated π-π* satellite components such as benzene ring are positioned at 285.9 eV and 290.8 eV; the C—C, C═C and CHx peaks have the same height as the main peak of C1s. The ratio of the COO group can be obtained by dividing the peak area of COO group by the total area of all peaks in the C1s spectrum. Similarly, each ratio of C═O group, C—O group and C—C group can be obtained.

In the present invention, it is preferable that both a surface and inside of the carbon fiber nonwoven fabric have little unevenness caused by a surface-finishing treatment. COO group and C—O group can be introduced into the carbon fibers by the surface-finishing treatment so that the adhesiveness to the matrix resin is enhanced. However, physical properties of the composite material might deteriorate in uniformity if such functional groups are introduced in the surface and the inside differently in the amount by uneven treatment. It is preferable that B/A as a uniformity between the surface and the inside of the base material is 0.80 to 1.00, and is preferably 0.85 to 1.00, and is further preferably 0.90 to 1.00 or 0.95 to 1.00, where (A) is a total of COO group ratio and C—O group ratio in C1s peak of carbon fibers on the surface of the nonwoven fabric while (B) is a total of COO group ratio and C—O group ratio in C1s peak of carbon fibers inside the nonwoven fabric exposed by cutting at a randomly-selected plane. If the value of uniformity is no less than 0.80, the treatment can be performed uniformly between the base material surface and the carbon fibers inside, so that a composite material with matrix resin having little unevenness of physical properties is obtained.

It is possible that the carbon fibers are provided with a sizing material. The sizing material may be a solution, emulsion, suspension or the like made from one or more kinds of epoxy resin, epoxy-modified polyurethane resin, polyester resin, phenolic resin, polyamide resin, polyurethane resin, polycarbonate resin, polyetherimide resin, polyamide-imide resin, polyimide resin, bismaleimide resin, urethane-modified epoxy resin, polyvinyl alcohol resin, polyvinylpyrrolidone resin, polyethersulfone resin or the like.

A compression-molded fiber-reinforced composite material generally has a characteristic to recover by so-called springback to have an initial thickness before being impregnated with resin when resin is removed from the carbon fiber nonwoven fabric. If such a springback is greatly caused undesirable deformation might be caused or thickness might be uneven. In order to minimize the springback of the carbon fiber nonwoven fabric, it is preferable that a ratio calculated by dividing a thickness of the fiber-reinforced composite material by a thickness after removing resin is 0.50 to 1.20, and is preferably more or equal to 0.70, and is more preferably more or equal to 0.90. It is preferably less or equal to 1.15, and is more preferably less or equal to 1.10.

In the present invention, it is preferable that the composite material comprises the carbon fibers and the resin and has a thickness of 2.6 to 10 mm. A uniform fiber-reinforced composite material can be provided with sufficient physical properties according to the thickness above 2.6 mm while it can easily be impregnated by a high productivity according to the thickness below 10 mm.

In the present invention, it is preferable that the carbon fiber nonwoven fabric has an apparent density of 0.6 to 1.3 $g/cm^3$. High physical properties can be exhibited above the apparent density of 0.6 $g/cm^3$ while carbon fibers are prevented from contacting each other below the apparent density of 1.3 $g/cm^3$, so that the material has a high specific strength with unbroken carbon fibers.

The apparent density of the carbon fiber nonwoven fabric, from which resin has already been removed from the composite material or which has not yet been impregnated with resin, can be obtained according to JISL19136.1 (thickness (A-method)) as follows. Thicknesses of 100 test pieces of 5 cm×5 cm are measured with the Automatic Compression Elasticity-Thickness Tester (CEH-400) made by DAIEI KAGAKU SEIKI MFG. Co., Ltd. after pressurized at 0.5 kPa for 10 seconds. An apparent density is calculated from the average of thus measured thicknesses, size (5 cm×5 cm) and weight, and then is rounded off to second decimal places. The apparent density of the carbon fiber nonwoven fabric is thus obtained in the present invention.

Next, the producing method of the fiber-reinforced composite material will be explained.

In the producing method of the fiber-reinforced composite material, crimped precursor fibers of carbon fibers are entangled and compressed, and then are burnt and impregnated with resin.

The carbon fibers may be crimped by a mechanical formation. Alternatively, false-twisted yarns or composite fibers of eccentric core-sheath type or side-by-side type may be thermally-treated to form the crimps.

The former type of formation is a mechanical crimp capable of controlling the number of crimps and crimp percentage by setting circumferential line speed difference, heat and pressure wherein the crimps are given to linear fibers with a push-in type crimper or the like, or fibers are introduced between gears to make a formation.

The latter type of formation is a thermal treatment to heat composite fibers comprising two or more kinds of resin having different melting points so that the fibers are crimped in three dimensions in accordance with thermal shrinkage rates. The cross section of the composite fibers may be eccentric core-sheath type or side-by-side type having different melting points between left and right components.

In the present invention, it is preferable that the fiber has a microscopical linear portion to achieve the strength as well as the quasi-isotropy, and the mechanical crimp is desirably employed to achieve both of them.

The present invention is characterized in that the carbon fibers are entangled. Ordinary carbon fibers would be broken with the entangling apparatus or could be crimped only roughly with great curves. However with PAN-based carbon fibers, flame-resistant yarns as carbon fiber precursor fibers before being charred can be made to have a rupture elongation of more or equal to 10%. Further, the fibers are entangled precisely with a entangling apparatus such as needle punch and water jet punch. Therefore, a crimped PAN-based carbon fiber nonwoven fabric can be produced by burning a PAN-based flame-resistant yarn nonwoven fabric which has been crimped in advance.

Besides, the PAN-based fibers for producing the PAN-based flame-resistant yarns are usually flameproofed in an atmosphere containing air of 4 to 25 mol % by an stretch ratio of 0.8 to 1.2 for 10 to 100 minutes at 150 to 350° C. It is preferable that the PAN-based flame-resistant yarns are designed to have a specific gravity within 1.3 to 1.38.

In the present invention, it is preferable that the fibers have a part continuous in the thickness direction in addition to the entangling to prevent the interlaminar exfoliation. In order to achieve such a structure, it is preferable that the flame-resistant yarn nonwoven fabric is produced with a needle punch and/or by a water jet entangling.

The web which is subjected to the flameproofing with the needle punch or water jet entangling may be a web made by laying in parallel or cross-laying carded fibers, air-laid dry web, papermade wet web or another web made by melt blowing, spunbonding, flash spinning or electrospinning, or combination of them. Above all the dry web would be advantageous to easily produce a thick nonwoven fabric.

Such obtained web can be subjected to the needle punch method or water jet method to prepare a nonwoven fabric, so that fibers are entangled with each other and are further oriented in the thickness direction. If the fibers are oriented in the thickness direction, the reinforcement effect tends to decrease in the surface and increase in the thickness direction. Such a tendency can be adjusted by selecting the needle shape or number of punching times of the needle punch, for example. If the number or volume of barbs or the number of needle punching times increases, more fibers move along the thickness direction. In the water jet entangling method, if the nozzle diameter or water pressure increases, fibers tend to move along the thickness direction. The fibers move greater along the thickness direction if the conveyance speed of the web or nonwoven fabric is slower. Besides, fibers might be entangled with each other if the fiber bundle is subjected to a crimping process such as mechanical crimping and false twisting. Such an entanglement is generally extremely weak, so that the crimps may be cancelled in a post process or even remaining crimps are not expected to stabilize the formation.

It is preferable that the flame-resistant nonwoven fabric is compressed to have an apparent density of 0.5 to 1.3 $g/cm^3$. It may be compressed before the entangling. However, it is preferable that the entangling is performed before the compression, in order to decrease the apparent density and the friction between fibers to transfer the fibers smoothly by the entangling treatment. The flame-resistant nonwoven fabric made with an entangling apparatus is around 0.02 to 0.20 $g/cm^3$, and therefore it is preferable to be compressed with a calendar or pressing machine to have an appropriate apparent density. In the compression process, it is preferable that the compression condition such as temperature, pressure and compression speed are controlled within an appropriate range which depends on raw material composition, spinning condition and flameproofing condition, as needed. It is preferable that the compression is well performed at a temperature higher or equal to 100° C., and more preferably higher or equal to 130° C. In case the flame-resistant yarns are broken or deteriorated by an excessive temperature, it is preferable that the compression is performed at a temperature lower or equal to 400° C., and more preferably lower or equal to 250° C.

It is preferable that the flame-resistant nonwoven fabric is subsequently burnt in an inert atomosphere above 800° C. to make a carbon fiber nonwoven fabric having an apparent density of 0.6 to 1.3 g/cm$^3$. It is necessary to adjust a compression condition such as pressing condition and compression load during compressing the flame-resistant nonwoven fabric to have an apparent density of 0.6 to 1.3 g/cm$^3$ finally in the carbon fibers.

The apparent density is preferably set appropriately according to the target fiber volume content. In other words, it is preferable that the porosity to be calculated from the apparent density is set appropriately according to the resin volume content which is calculated by removing the fiber volume content from a whole volume content. It is preferable that the carbon fiber nonwoven fabric has a porosity of less or equal to 1.50 times of a target resin volume content, the porosity preferably being less or equal to 1.20 times thereof. If the porosity is less or equal to 1.50 times thereof, initial voids could be impregnated with most of the resin. The compression can be suppressed during the impregnation to prevent the fibers from breaking. On the other hand, if the carbon fiber nonwoven fabric has too low an apparent density, the voids might not be impregnated with a whole resin and therefore it might be difficult for the target fiber volume content to be achieved. Accordingly, it is preferable that the porosity is more or equal to 0.80 times of the resin volume content.

It is preferable that the carbon fiber surface is subjected to a finishing treatment so that a total ratio of COO group and C—O group is more or equal to 5% in Cls peak detected with ESCA on the carbon fiber surface. It is preferable that the finishing treatment is a liquid-phase oxidation treatment because a gas-phase treatment such as ozone gas oxidation, corona treatment and plasma treatment might cause unevenness between the surface and inner fibers of the carbon fiber nonwoven fabric.

The finishing treatment is performed after forming a carbon fiber nonwoven fabric. It is important that the finishing treatment causes little unevenness both on the surface and inside of the carbon fiber nonwoven fabric. It is preferable to actively remove treatment unevenness which is sometimes caused by bubbles inside the nonwoven fabric during the finishing treatment on the nonwoven fabric. The finishing treatment can enhance the adhesiveness to matrix resin with COO group and C—O group introduced in carbon fibers. However, the composite material might reduce in uniformity of physical properties if there is a great difference between the amounts of introduced functional groups caused by the treatment unevenness between the surface and inside of the nonwoven fabric.

In order to remove bubbles from the inside of such a thick carbon fiber nonwoven fabric as provided by the present invention, it is preferable that an ultrasonic treatment is performed in a finishing treatment bath so that impurities on the carbon fiber surface are washed away at the same time of removing bubbles from the inside of the structure. It is preferable that the ultrasonic frequency is 24 kHz to 300 kHz, and is more preferably 24 kHz to 200 kHz, so that bubbles are highly removed with a good washing effect without breaking the shape of the carbon fiber structure while the finishing treatment is performed to keep the oxidization condition uniform in the inside and outside of the carbon fiber nonwoven fabric.

In order to remove bubbles from the inside of the structure, it is also preferable that the finishing treatment liquid is agitated, that the treatment liquid is flowed against the nonwoven fabric feeding direction and that bubbles are sucked. Particularly, it is preferable to employ the suction method in which the treatment liquid is flowed uniformly inside the structure with an extremely high efficiency to flow in a structure thickness direction. It is preferable that a vacuum is 10 to 300 torr during the suction process to suck bubbles efficiently removed from the structure so that the finishing treatment is performed to keep the oxidization condition uniform in the inside and outside of the carbon fiber nonwoven fabric as suppressing the cost of installing a vacuum pump. The vacuum is preferably more or equal to 20 torr, and is more preferably more or equal to 30 torr. It is also preferable that the vacuum is less or equal to 200 torr, and is more preferably less or equal to 100 torr.

In the present invention, it is preferable that the finishing treatment is an electric oxidation. An electrolyte used in the electric oxidation treatment may be acid such as sulfuric acid, nitric acid, hydrochloric acid, carbonic acid, ammonium nitrate, ammonium dihydrogen nitrate, ammonium dihydrogenphosphate and ammonium phosphate dibasic, hydroxide such as sodium hydroxide, potassium hydroxide and barium hydroxide, mineral salt such as sodium carbonate, sodium hydrogen carbonate, sodium phosphate and potassium phosphate, organic salt such as sodium maleate, sodium acetate and potassium acetate and sodium benzoate, alkali such as ammonia, ammonium carbonate, ammonium hydrogen carbonate, and a mixture thereof.

The concentration of the electrolyte solution may be around 0.1 to 2 mol/L in order to perform an efficient treatment.

It is preferable that the electric oxidation is performed with a plurality of electrolyzers to be able to optimize the oxidation electricity in the electrolyzers according to the carbonization degree of carbon fiber to be subjected to the finishing treatment. Further, it is preferable that a total electricity is 5 to 1000 [Coulombs/g-Carbon fiber] and is more preferably 10 to 500 [C/g] so that the carbon fibers are well impregnated with matrix resin and are prevented from being excessively oxidized to deteriorate in strength.

It is preferable that the finishing treatment is an oxidation treatment with ozone water. The oxidation treatment with ozone water doesn't require any electrolyte which may stay behind to influence physical properties.

The oxidation treatment with ozone water is performed such that a carbon fiber structure is immersed in a bath of ozone gas dissolved in pure water. It is preferable that an ozone concentration of the ozone water is 10 mg/L to 110 mg/L to perform the oxidation treatment with the ozone water at an excellent cost performance. The concentration is preferably 30 to 100 mg/L, and is more preferably 40 to 90 mg/L.

For the same reason, it is preferable that a treatment time in the ozone water bath is 1 to 10 minutes, and it is more preferably 2 to 7 minutes and is further preferably 3 to 5 minutes.

The carbon fiber structure is thus treated to prepare a carbon fiber nonwoven fabric in which a total ratio of COO group and C—O group measured with the ESCA on the carbon fiber surface of the carbon fiber nonwoven fabric is more or equal to 10%. The total ratio is preferably more or equal to 5%, and is more preferably more or equal to 15%.

Next, thus obtained carbon fiber nonwoven fabric is impregnated with resin. The impregnation method can be selected appropriately depending on the forming method applied.

It is preferable that a ratio (impregnated/unimpregnated) of fiber structure thickness before and after the impregnation is 0.5 to 1.2. The fibers could be prevented from breaking above 0.5 of the ratio while a dense fiber-reinforced composite material could be obtained below 1.2 of the ratio. In order to set the thicknesses before and after the impregnation in such a ratio, it is necessary to regulate a compression condition of the flame-resistant nonwoven fabric such as pressing condition and load applied during the heating. In order to achieve such a ratio, it is also possible that a thermoplastic resin film put on the carbon fiber nonwoven fabric is pressed as being heated to melt at controlled temperature, pressure and compression speed during the resin impregnation.

Such crimped fibers should be contained in the fiber-reinforced composite material at a proportion enough to contribute the isotropy and high tensile strength. It is not necessary that all fibers constituting the fiber-reinforced composite material are crimped reinforcing fibers.

EXAMPLES

Physical properties in examples are determined by the following methods.

A. Tensile Strength, CV Level

A tensile stress at break is measured with a small test piece of type 1BA along each direction of 0°, 15°, 30°, 45°, 60°, 75°, and 90° in the sample surface according to JIS K7161-7164 (1994). Measured tensile stresses at break of all directions are averaged to obtain a tensile strength. A Coefficient of Variation (CV level) is calculated from a standard deviation and a tensile stress at break (tensile strength) averaged among all the directions.

B. Number of Crimps

The measurement is performed based on JIS L10158.12.1 (2010). Crimps are counted 20 times in length of 25 mm and then an average is rounded off to one decimal place. The crimps are counted as a half of all the counted mountains and valleys of crimp.

C. Crimp Percentage

The measurement of crimp percentage is performed based on JISL10158.12.2 (2010). The crimp percentage [%] is calculated for 20 samples by the following formula and then rounded off to one decimal place.

$$\text{Crimp percentage} = (b-a)/b \times 100$$

a: Length [mm] when the first load (0.18 mN×tex number) is applied b: Length [mm] when a load (4.41 mN×tex number) is applied D. Apparent Density of Carbon Fiber Nonwoven Fabric According to JIS L19136.1 (thickness (A-method)), 10 parts of each thickness of 5 test pieces of 20 cm×20 cm are measured with the Automatic Compression Elasticity-Thickness Tester (Type: CEH-400) made by DAIEI KAGAKU SEIKI MFG. Co., Ltd. after pressurized for 10 seconds at 0.5 kPa to obtain an average thickness. From the average thickness, area (20 cm×20 cm) and weight, an apparent density is calculated to two decimal places. Thus obtained apparent densities of 5 pieces are averaged to get an apparent density of the base material.

E. Porosity

A porosity is calculated to one decimal place by the following formula.

$$\text{Porosity [\%]} = \{(\text{True density of carbon fiber}) - (\text{Apparent density of carbon fiber nonwoven fabric})\} \div (\text{True density of carbon fiber}) \times 100$$

Here, the true density of carbon fiber is 1.78.

Example 1

From copolymer consisting of acrylonitrile (AN) of 99.4 mol % and methacrylate of 0.6 mol %, AN-based fiber bundles having filament denier of 1 d and filaments of 12,000 are prepared by a dry-wet spinning method. Thus obtained PAN-based fiber bundles are heated with stretch ratio of 1.05 in air at 240 to 280° C. to make PAN-based flame-resistant yarns (density: 1.38 g/cm$^3$).

Next, the PAN-based flame-resistant yarns are crimped with a push-in type crimper. Thus obtained zigzag shaped crimped yarns have number of crimps of 7.1/25 mm and crimp percentage of 12.7%. The flame-resistant yarns are cut into pieces having number average fiber length of 76 mm to make a web with a card and cross lapper, and then the web is entangled with a needle punch to make a PAN-based flame-resistant nonwoven fabric having apparent density of 0.10 g/cm$^3$ (porosity: 94.4%).

Thus obtained PAN-based flame-resistant nonwoven fabric is pressed with a pressing machine heated to 200° C. to have apparent density of 0.71 g/cm$^3$ (porosity: 60.1%).

Next, the fabric is heated to 1500° C. in a nitrogen atmosphere and burnt, and then is electrolyzed at 100 C/g-Carbon fiber in hydrogen carbonic acid ammonium solution of 0.1N to make a PAN-based carbon fiber nonwoven fabric.

The PAN-based carbon fiber nonwoven fabric is impregnated with melted nylon 6 having density of 1.14 g/cm$^3$ to produce a fiber-reinforced composite material having fiber volume content (Vf) of 40% (resin volume content: 60%; porosity: 1.00 time of the resin volume content). The evaluation result of thus produced fiber-reinforced composite material is listed in Table 1 which shows that a high quasi-isotropy has been provided without lamination.

Example 2

The same treatment is performed as shown in Example 1 except that the number of crimps is set to 12.5/25 mm. The result is listed in Table 1 which shows that the strength has decreased although the CV level is slightly better in comparison with Example 1.

Example 3

The same treatment is performed as shown in Example 1 except that the number of crimps is set to 3.0/25 mm. The result is listed in Table 1 which shows that although the strength is slightly better the CV level has decreased greatly in comparison with Example 1.

Example 4

The same treatment is performed as shown in Example 1 except that the apparent density of carbon fiber nonwoven fabric is set to 0.50 g/cm$^3$ (porosity: 71.9%) by pressing at a different pressure while the fiber volume content (Vf) is set to 30% (resin volume content: 70%; porosity is 1.03 times of the resin volume content). The result is listed in Table 1 which shows that the tensile strength has decreased corresponding to the decreased Vf while the CV level is the same in comparison with Example 1.

Example 5

The same treatment is performed as shown in Example 1 except that the apparent density of carbon fiber nonwoven fabric is set to 0.25 g/cm$^3$ (porosity: 86.0%) by pressing at a different pressure while the fiber volume content (Vf) is set to 40% (resin volume content: 60%). The porosity is 1.43 times of the resin volume content. The result is listed in Table 1 which shows that the strength has decreased slightly in comparison with Example 1.

Example 6

The same treatment is performed as shown in Example 1 except that the apparent density of carbon fiber nonwoven fabric is set to 0.13 g/cm$^3$ (porosity: 92.7%) by pressing at a different pressure while the fiber volume content (Vf) is set to 40% (resin volume content: 60%). The porosity is 1.54 times of the resin volume content. The result is listed in Table 1 which shows that the strength has decreased further in comparison with Example 1 and Example 5.

Example 7

The same treatment is performed as shown in Example 1 except that the electrolyzation is accompanied with an ultrasonic treatment at 26 kHz. In the result, the strength has improved and the CV level is the same in comparison with Example 1. The total ratio of COO group and C—O group on the carbon fiber surface is 10%.

Example 8

The same treatment is performed as shown in Example 1 except that the electrolyzation is omitted. In the result, both the strength and CV level have decreased greatly in comparison with Example 1. The total ratio of COO group and C—O group on the carbon fiber surface is 0%.

Example 9

The same treatment is performed as shown in Example 1 except that the flame-resistant yarns are cut into pieces having number average fiber length of 170 mm. In the result, the strength has improved and the CV level is the same in comparison with Example 1.

Example 10

The same treatment is performed as shown in Example 1 except that the apparent density of the PAN-based flame-resistant yarn nonwoven fabric is set to 0.575 g/cm$^3$ by compressing with a pressing machine heated to 200° C. In the result, the strength has decreased and the CV level is the same in comparison with Example 1.

Example 11

The same treatment is performed as shown in Example 1 except that the thickness is set to 1.0 mm by reducing the amount per unit area of carbon fibers and resin. In the result, both the strength and CV level are the same in comparison with Example 1.

Example 12

The same treatment is performed as shown in Example 1 except that a water jet entangling process is performed instead of the entangling with the needle punch. In the result, both the strength and CV level are the same in comparison with Example 1.

Comparative Examples 1-3

Differently from Example 1, the PAN-based flame-resistant yarns are burnt subsequently to make PAN-based carbon fibers without being crimped and cut. Next, the fibers are cut into pieces of discontinuous non-crimp carbon fibers having number average fiber length of 51 mm, from which a web having apparent density of 0.11 g/cm$^3$ (porosity: 93.8%) is formed with a card and cross lapper. Next, the web is impregnated with melted nylon 6 having density of 1.14 g/cm$^3$ to produce fiber-reinforced composite materials having fiber volume content (Vf) of 20, 30 and 40%. The evaluation results are listed in Table 1 which shows that a strong in-plane anisotropy would be exhibited without a lamination. The results show that the Vfs changing between 20 to 40% don't contribute the strength as much as the Vfs of the above-described Examples.

Comparative Example 4

The same treatment is performed as shown in Example 6 except that the fiber volume content (Vf) is set to 20%. The porosity is 1.16 times of the resin volume content. The result is listed in Table 1 which shows that the strength has decreased corresponding to the decreased Vf from Example 6 and that the strength has decreased from the material made from non-crimp fibers in Comparative Example 1.

Comparative Example 5

When the web prepared in Example 1 was subjected to a pressing process without entangling with a needle punch, fibers got apart from each other to have free fibers and caused the formation instability so that the web was hardly conveyed.

Comparative Example 6

Copolymers consisting of acrylonitrile (AN) of 99.4 mol % and methacrylate of 0.6 mol % are subjected to a dry-wet spinning process to make AN-based fiber bundles having filament denier of 1 d and filaments of 12,000. Thus obtained PAN-based fiber bundles are heated by stretch ratio of 1.05 in air at 240 to 280° C. to make PAN-based flame-resistant yarns having density of 1.38 g/cm$^3$.

Next, after the PAN-based flame-resistant yarns are cut into pieces having number average fiber length of 5 mm to make a web by a papermaking method, and then the web is entangled with a water jet punch to make a PAN-based flame-resistant nonwoven fabric having apparent density of 0.12 g/cm$^3$ (porosity: 94.4%).

Thus obtained PAN-based flame-resistant yarn nonwoven fabric is compressed with a pressing machine heated to 200° C. to have the apparent density of 0.71 g/cm$^3$ (porosity: 60.1%).

Next, the fabric is burnt in nitrogen atmosphere at 1500° C. and then is electrolyzed at 100 C/g-Carbon fiber in hydrogen carbonic acid ammonium solution of 0.1N to make a PAN-based carbon fiber nonwoven fabric.

The PAN-based carbon fiber nonwoven fabric is impregnated with nylon 6 having density of 1.14 g/cm$^3$ to produce a fiber-reinforced composite material having fiber volume content (Vf) of 40% (resin volume content: 60%; porosity is 1.00 time of the resin volume content). The result is listed in Table 1 which shows that the quasi-isotropy is inferior in comparison with Example 1.

TABLE 1

| | Entangling Condition | Condition | Crimp Number of Crimps | Crimp percentage | Vf % | CV | Tensile Strength MPa |
|---|---|---|---|---|---|---|---|
| Example 1 | Entangled | Crimped | 7.1 | 12.7 | 40 | 3.6 | 398 |
| Example 2 | Entangled | Crimped | 12.5 | 13.0 | 40 | 3.2 | 368 |
| Example 3 | Entangled | Crimped | 3.0 | 7.5 | 40 | 9.5 | 405 |
| Example 4 | Entangled | Crimped | 7.1 | 12.7 | 30 | 3.6 | 323 |
| Example 5 | Entangled | Crimped | 7.1 | 12.7 | 40 | 3.6 | 377 |
| Example 6 | Entangled | Crimped | 7.1 | 12.7 | 40 | 3.6 | 329 |
| Comparative Example 1 | Not Entangled | Not Crimped | 0.0 | 0.0 | 20 | 63.8 | 258 |
| Comparative Example 2 | Not Entangled | Not Crimped | 0.0 | 0.0 | 30 | 63.2 | 285 |
| Comparative Example 3 | Not Entangled | Not Crimped | 0.0 | 0.0 | 40 | 64.1 | 290 |
| Comparative Example 4 | Entangled | Crimped | 7.1 | 12.7 | 20 | 3.6 | 250 |
| Comparative Example 6 | Entangled | Not Crimped | 0.0 | 0.0 | 40 | 12.2 | 256 |

The invention claimed is:

1. A method for producing a fiber-reinforced composite material comprising the steps of:
    entangling a nonwoven fabric of crimped precursor carbon fibers to form an entangled nonwoven fabric;
    compressing the entangled nonwoven fabric to form a compressed nonwoven fabric;
    burning the compressed nonwoven fabric to form a burnt nonwoven fabric having a porosity of less than or equal to 1.20 times and more than or equal to 0.80 times a target resin volume content; and
    impregnating the burnt nonwoven fabric with a resin to produce a fiber-reinforced composite material having a fiber volume content set to 30 to 80%.

2. The method for producing a fiber-reinforced composite material according to claim 1, further comprising a step of subjecting the burnt nonwoven fabric to a treatment liquid with ultrasonic agitation so as to finish the carbon fiber surfaces before impregnating the burnt nonwoven fabric with a resin.

3. The method for producing a fiber-reinforced composite material according to claim 1, wherein a ratio of the fiber-reinforced composite material thickness after being impregnated with a resin to the burnt nonwoven fabric thickness before being impregnated with a resin, (after impregnation/before impregnation), is set to 0.5 to 1.2.

4. The method for producing a fiber-reinforced composite material according to claim 1, wherein the step of entangling the nonwoven fabric is performed by a needle punch method and/or a water jet entangling method.

5. The method for producing a fiber-reinforced composite material according to claim 2, wherein a ratio of the fiber-reinforced composite material thickness after being impregnated with a resin to the burnt nonwoven fabric thickness before being impregnated with a resin, (after impregnation/before impregnation), is set to 0.5 to 1.2.

6. The method for producing a fiber-reinforced composite material according to claim 2, wherein the step of entangling the nonwoven fabric is performed by a needle punch method and/or a water jet entangling method.

7. The method for producing a fiber-reinforced composite material according to claim 3, wherein the step of entangling the nonwoven fabric is performed by a needle punch method and/or a water jet entangling method.

8. The method for producing a fiber-reinforced composite material according to claim 1, wherein the crimped precursor carbon fibers are mechanically crimped.

9. A fiber-reinforced composite material produced by the method according to claim 1.

* * * * *